US007061232B2

(12) United States Patent
Haas et al.

(10) Patent No.: US 7,061,232 B2
(45) Date of Patent: Jun. 13, 2006

(54) POSITION TRANSMITTER WITH AT LEAST ONE MAGNETORESISTIVE SENSOR AND ASSOCIATED MAGNETIC MULTIPOLE WHEEL

(75) Inventors: Gunther Haas, St. Grégoire (FR); Henrik Siegle, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 226 days.

(21) Appl. No.: 10/362,113

(22) PCT Filed: Aug. 21, 2001

(86) PCT No.: PCT/DE01/03190

§ 371 (c)(1),
(2), (4) Date: Jul. 14, 2003

(87) PCT Pub. No.: WO02/06878

PCT Pub. Date: Feb. 28, 2002

(65) Prior Publication Data

US 2004/0012386 A1    Jan. 22, 2004

(30) Foreign Application Priority Data

Aug. 22, 2000   (DE)   ................. 100 41 087

(51) Int. Cl.
G01B 7/30  (2006.01)
(52) U.S. Cl. ............................. 324/207.21; 324/207.25
(58) Field of Classification Search .............. 324/207.2, 324/207.21, 207.23, 207.24, 207.25, 252; 338/32 R, 32 H
See application file for complete search history.

(56) References Cited

U.S. PATENT DOCUMENTS

| 4,818,939 A | 4/1989 | Takahashi |
| 5,430,375 A | 7/1995 | Inoue |
| 5,680,042 A * | 10/1997 | Griffen et al. ......... 324/207.21 |
| 5,930,905 A * | 8/1999 | Zabler et al. .............. 33/1 PT |
| 6,300,758 B1 * | 10/2001 | Griffen et al. ......... 324/207.21 |

FOREIGN PATENT DOCUMENTS

DE    195 06 938 A1    8/1996

* cited by examiner

*Primary Examiner*—Jay M. Patidar
(74) *Attorney, Agent, or Firm*—Michael J. Striker

(57) ABSTRACT

A position transmitter includes at least one magnetoresistive sensor and an associated magnetic multipole wheel having a large number of uniformly arranged pole pairs (2). The at least one sensor comprises first, second third, and fourth magnetoresistive resistors that are electrically connected as a Wheatstone bridge with four half bridges, with a voltage UO being fed in one bridge diagonal and a sinusoidal or cosinusoidal signal being produced on the other diagonal. A distance (d) between the first and second or third and fourth resistors located paral el to one another is selected with reference to a scanning direction of the multipole wheel, such that it is not equal the wavelength of a pole pair. A distance between the first and second resistors and between the third and fourth resistors is the same.

5 Claims, 3 Drawing Sheets

Basic generation of the individual signals and averaging

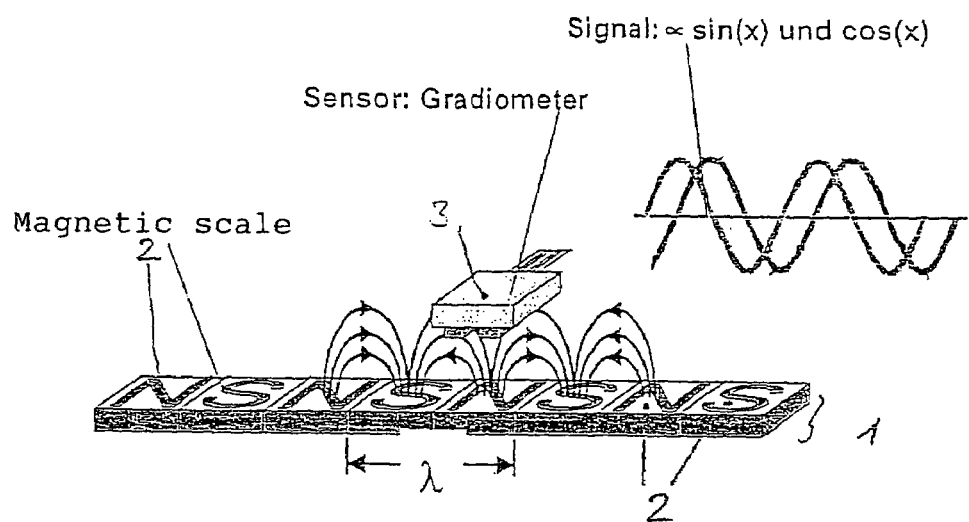
Fig. 1: Scanning of a magnetic scale
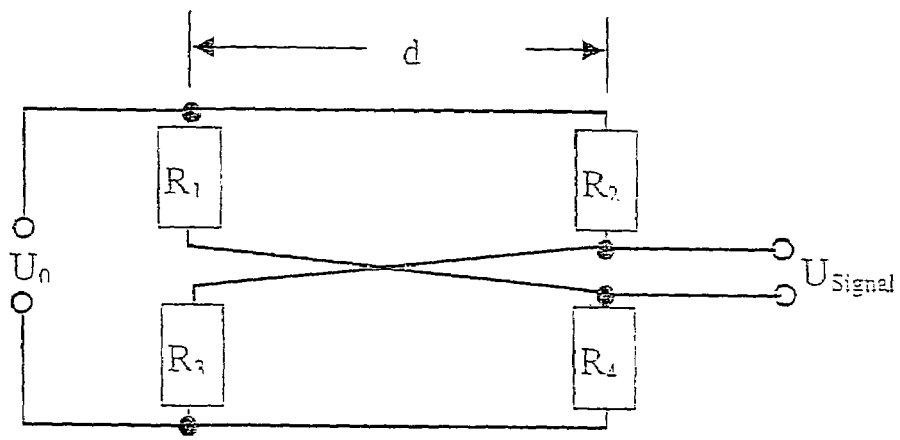
Fig. 2: Gradiometer bridge

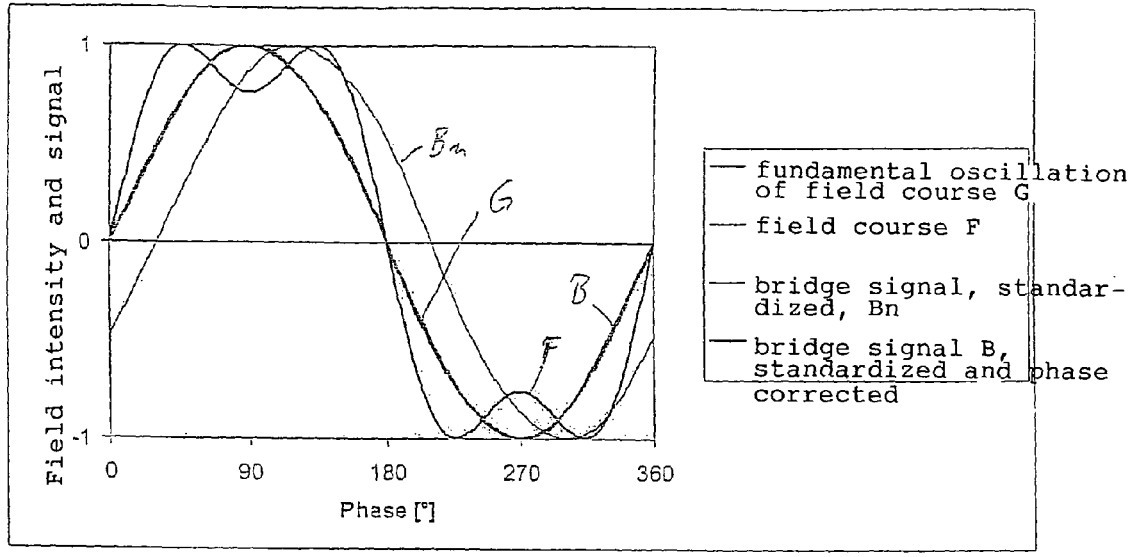
Fig. 3: Bridge with d=λ/3, filter action on field course with 30% proportion of the third harmonic
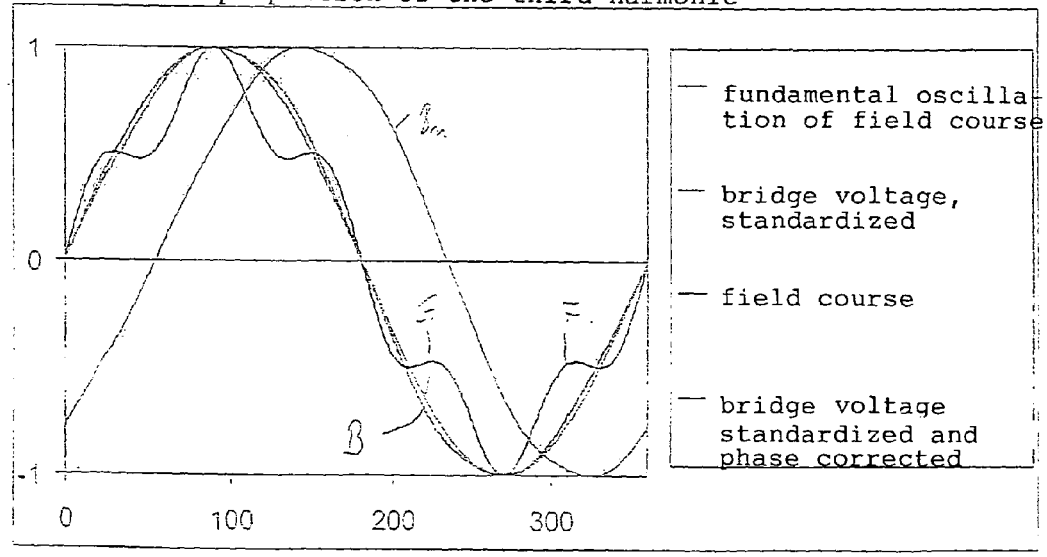
Fig. 4: Bridge with d=λ/5, folter action on field course with a 20% proption of the fifth harmonic

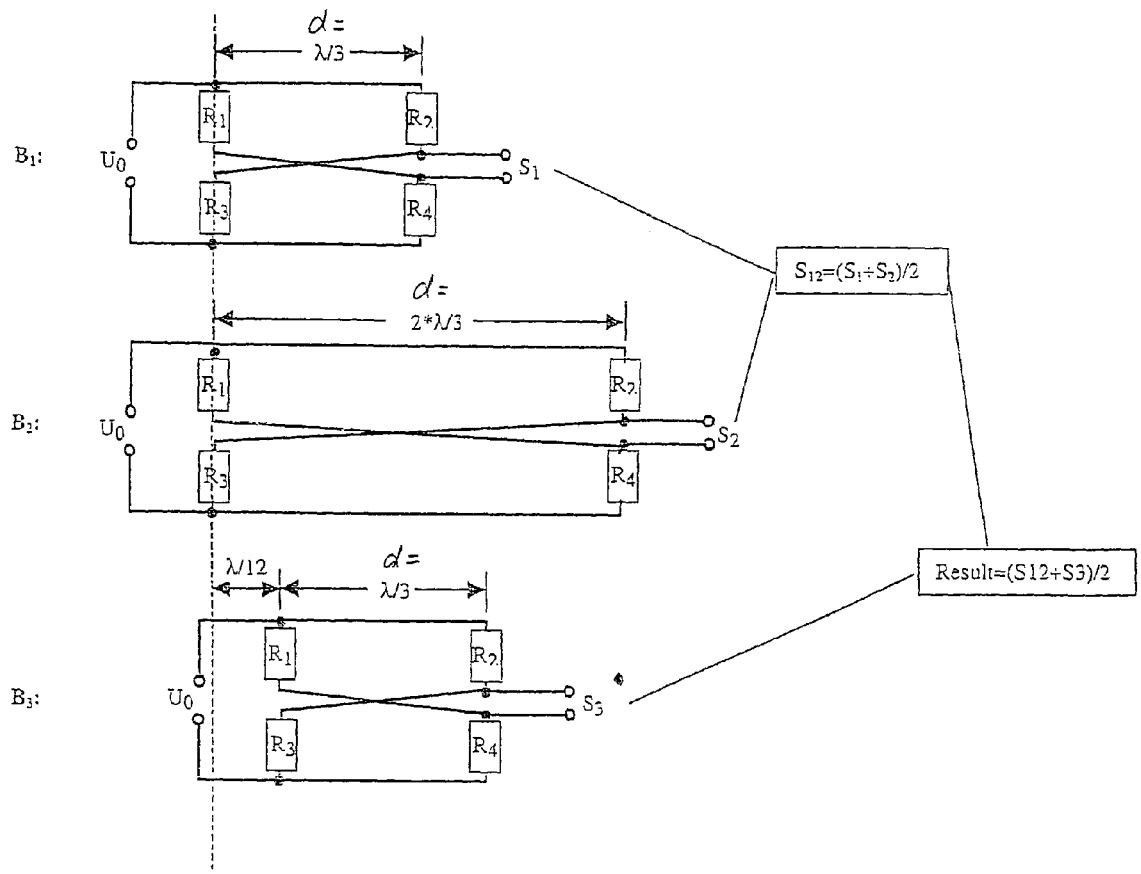
Fig. 5: Basic generation of the individual signals and averaging
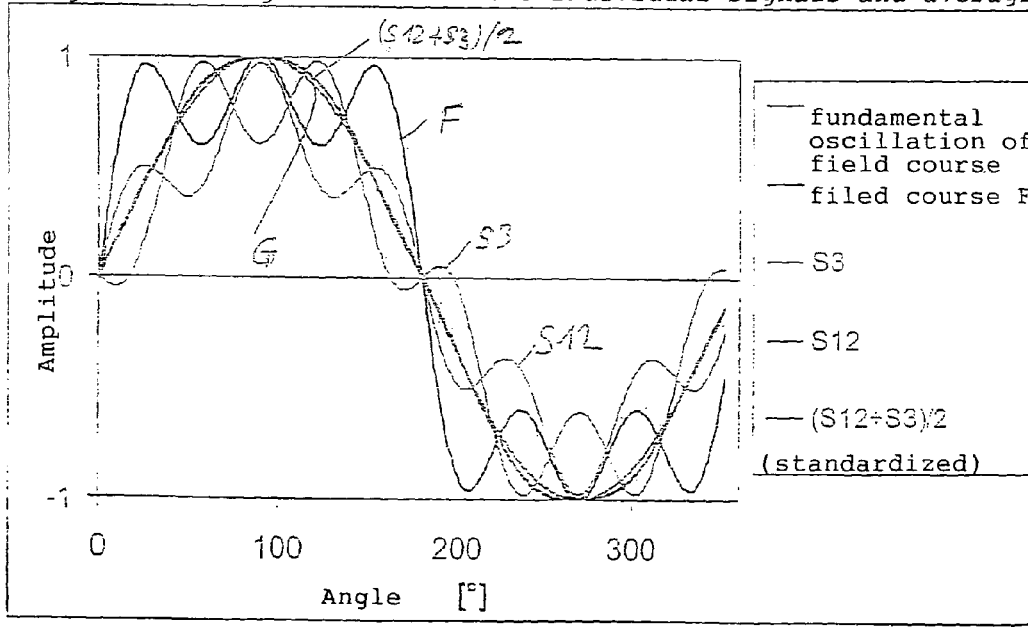
Fig. 6: Disposition as described in the text; filter action on field course with 30% proportion of the third harmonic and a 30% proportion of the fifth harmonic

POSITION TRANSMITTER WITH AT LEAST ONE MAGNETORESISTIVE SENSOR AND ASSOCIATED MAGNETIC MULTIPOLE WHEEL

BACKGROUND OF THE INVENTION

Position and angle measurement by scanning magnetic scales or multipole wheels is described in the prior art, for instance in German Patent Disclosure DE 195 06 938 A1.

OBJECT OF THE INVENTION

At the distances, or spacings, that result in practice between a magnetic sensor and a scale, the course of the magnetic field is not ideally sinusoidal—as assumed—but instead includes square-wave components, which can be generally well described by a third and fifth harmonic of the sine-wave function. This limits the precision of the method, however. A field course free of harmonics generally exists only at relatively great operative spacings and thus at very low working field intensities (the field intensity drops off exponentially with the distance), which makes the system very vulnerable to malfunction.

The invention proposes a sensor structure which on the basis of its geometry filters the third and/or the fifth harmonic out of the signal, so that a sinusoidal course results as the measured value, even for only slight spacings between the sensor and the scale. As a result of the aforementioned harmonic correction, the course is moreover largely independent of the working spacing of the sensor, so that even the influence of an eccentricity that may be present in the system on the outcome of measurement is minimized.

SUMMARY OF THE INVENTION

Position transducers with improved precision and vulnerability to malfunction by operation at small working spacings. Insensitive to eccentricities of the pole wheel or to its position.

BRIEF DESCRIPTION OF THE DRAWINGS

FIG. 1 shows a gradiometer used to scan magnetic scales;

FIG. 2 shows a Wheatstone bridge circuit, comprising four identical magnetoresistive elements;

FIG. 3 shows a case in which the bridge voltage is reduced to 90% compared to the bridge with d=lambda/2, and the bridge signal is offset by a phase of 30° compared to the fundamental of the original signal;

FIG. 4 shows how the fifth harmonic can be suppressed by means of a spacing of the half-bridges of d=lambda/5, or a multiple thereof;

FIGS. 5 and 6 show an arrangement and signal evaluation by means of which sufficiently good harmonic suppression is achieved when the third and the fifth harmonics are suppressed.

DETAILED DESCRIPTION OF THE PREFERRED EMBODIMENTS

It is state of the art to scan magnetic scales (such as multipole wheels) using so-called gradiometers; see also FIG. 1. This involves a Wheatstone bridge circuit, comprising four identical magnetoresistive elements, with the two half-bridges spatially separated; see FIG. 2. Each individual element of the bridge furnishes a voltage as a function of the magnetic field applied to it. We assume that the output voltage of each individual element of the bridge varies sinusoidally with the directional angle of the magnetic field applied. This is particularly true if a so-called spin valve is used as the magnetoresistive element. If the scale in this case moves past the sensor by a spacing of one pole pair, this is equivalent to a phase of 360° of the signal at the single resistor. The spacing of the two half-bridges, symbolized by the letter d, is typically half the length of one pole pair, that is, lambda/2 (see FIG. 1), since the phases of the signals at the half-bridges are phase-offset by 180°, and thus a sinusoidal bridge output signal of maximum amplitude is available.

The invention now makes use of the fact that even at a spacing d of the two half-bridges not equal to lambda/2, in most cases a sinusoidal bridge signal is available, although with a slightly reduced amplitude. The bridge for harmonics of period d furnish no signal.

For reasons of symmetry, with the aforementioned pole wheels, only odd-numbered harmonics occur. If one seeks to make a bridge that suppresses the third harmonic, then the spacing d=lambda/3 (120°), or a multiple thereof, should be selected. In that case, the phase between the half-bridges is 120°, which is precisely equivalent to the period of the third harmonic. In that case, the bridge voltage is reduced to 90%, compared to the bridge with d=lambda/2, and the bridge signal is offset by a phase of 30° compared to the fundamental of the original signal; see FIG. 3.

The fifth harmonic can be suppressed in the same way by means of a spacing of the half-bridges of d=lambda/5, or a multiple thereof; see FIG. 4.

In practice, sufficiently good harmonic suppression is achieved if the third and the fifth harmonics are suppressed. This can be achieved by the following arrangement and signal evaluation (see FIGS. 5 and 6):

1. The signal $S_1$ of a bridge $B_1$ with d=lambda/3 is averaged with the signal $S_2$ of a second bridge $B_2$ with d=2*lambda/3; the resultant signal is $S_{12}$.

2. A signal $S_3$ of a bridge $B_3$ with d=lambda/3 is also available, which is phase-offset from $B_1$ and $B_2$ by 30°. This is accordingly the phase-corrected signal of the 120° bridge.

3. The mean value between $S_{12}$ and $S_3$ results in the field course, with the third and fifth harmonics filtered out.

The invention claimed is:

1. A position transmitter, comprising at least one magnetoresistive sensor and an associated magnetic multipole wheel having a large number of uniformly arranged pole pairs (2), wherein the at least one sensor comprises first, second, third, and fourth magnetoresistive resistors that are electrically connected as a Wheatstone bridge with two half bridges, with a voltage UO being fed in one bridge diagonal and a sinusoidal or cosinusoidal signal being produced on the other diagonal, wherein a distance (d) between the first and second or third and fourth resistors located parallel to one another is selected with reference to a scanning direction of the multipole wheel, such that it is not equal to the wavelength of a pole pair, wherein a distance between the first and second resistors and between the third and fourth resistors is the same, a second sensor, the second sensor is electrically in the form of a Wheatstone bridge with two half bridges, and wherein the distance between the half bridges of the first sensor is d=λ/3 and the distance between the half bridges of the second sensor is d=2*λ/3.

2. The position transmitter according to claim 1, wherein signals from the two bridges are averaged.

3. The position transmitter according to claim 1, further comprising a third sensor, wherein the third sensor is connected electrically in the form of a Wheatstone bridge with two half bridges, and, wherein the distance d between the half bridge of the third sensor is $\lambda/3$, and wherein the third sensor is arranged with a phase shift of 30° with respect to the first and second bridges.

4. The position transmitter of claim 3, wherein a mean value is determined from the signals from the first, second, and third sensors.

5. The position transmitter of claim 1, wherein the sensor is adapted to determine a rotation angle.

* * * * *